J. HARRIS.
Improvement in Harrows.
No. 130,916. Patented Aug. 27, 1872.
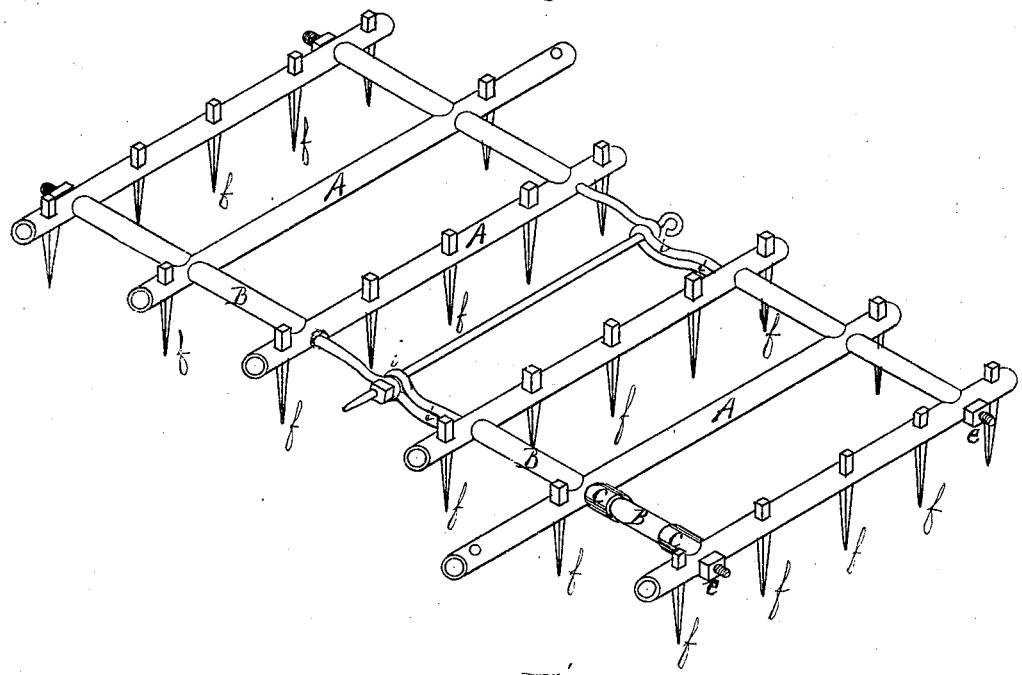
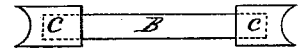
Witnesses
J. L. Borne
C. M. Richardson
Inventor
James Harris
per Dewey &
Attys

UNITED STATES PATENT OFFICE.

JAMES HARRIS, OF SAN FRANCISCO, CALIFORNIA.

IMPROVEMENT IN HARROWS.

Specification forming part of Letters Patent No. 130,916, dated August 27, 1872.

*To all whom it may concern:*

Be it known that I, JAMES HARRIS, of the city and county of San Francisco, State of California, have invented an Improved Metallic Tubular Harrow; and I do hereby declare the following description and accompanying drawing are sufficient to enable any person skilled in the art or science to which it most nearly appertains, to make and use my said invention or improvements without further invention or experiment.

My invention relates to an improvement in field-harrows; and my improvement consists in constructing the frame of the harrow of metallic pipe. It also relates to an end piece or washer of peculiar construction, which is used to provide a bearing for the transverse tubes against the longitudinal ones.

In order to more fully illustrate and explain my invention, reference is had to the accompanying drawing forming a part of this specification, in which—

Figure 1 is a perspective view. Fig. 2 shows the casting for holding the ends of the connecting-tubes.

A A A represent pipes or metallic tubes, which I use to form the longitudinal timbers of a field-harrow. These tubes are united together by short transverse tubes B, which are held in place by iron rods passing through the transverse tubes and through the sides of the longitudinal tubes, and are drawn together by nuts $e$ on the ends of the rods, the rods being bent so as to form eyes $i$ and shoulders $e'$ to arrest the rods $e$. The transverse tubes need not necessarily be as large as the cross tubes. In order to fit the ends of the transverse tubes against the convex face of the longitudinal tubes I employ a casting, C, one end of which is made concave to fit the convex side of the tube, while the other end is recessed so as to allow the end of the small tube to be slipped into it. The casting has a hole through it through which the rod which binds the tubes together passes. This washer provides a solid bearing for the end of the cross-tube, as by slipping the end of the tube into the recess a perfectly firm bearing is provided; besides, when small tubes are used the hole through them is not large enough to permit a cork end to be slipped into the tube as has heretefore been practiced. The teeth $ff$ are driven through holes made in the longitudinal tubes, and can be secured by a key below the tube if found necessary.

Having thus described my invention, what I claim, and desire to secure by Letters Patent, is—

1. A field-harrow constructed of the longitudinal metallic tubes A and transverse binding-tubes B, substantially as above described.

2. The washer C having one end made concave to fit the convex of the side tube, while its opposite end is provided with a recess to receive the end of the transverse tube so as to prevent it from splitting when the harrow is drawn together, as above described.

In witness whereof I have hereto set my hand and seal.

JAMES HARRIS. [L. S.]

Witnesses:
 J. L. BOONE,
 C. M. RICHARDSON.